United States Patent [19]

Böhmer

[11] 4,010,528
[45] Mar. 8, 1977

[54] MULTI-PARTITE GUIDE ROLL

[75] Inventor: Eberhard Böhmer, Heilshorn, Germany

[73] Assignee: Klockner-Werke AG, Duisburg, Germany

[22] Filed: Apr. 18, 1975

[21] Appl. No.: 569,174

[30] Foreign Application Priority Data

May 14, 1974 Germany .......................... 2423224
Apr. 27, 1974 Germany .......................... 2420514

[52] U.S. Cl. .................................................. 29/125
[51] Int. Cl.² ........................................ B21B 13/08
[58] Field of Search ............. 29/125, 121 A; 69/10

[56] References Cited
UNITED STATES PATENTS

| 165,819 | 7/1875 | Hahn | 29/125 X |
|---|---|---|---|
| 375,352 | 12/1887 | Handloser | 29/125 |
| 1,010,752 | 12/1911 | Haines | 69/10 |
| 1,602,665 | 10/1926 | Hahlbeck | 69/10 |
| 1,883,184 | 10/1932 | Weber | 29/125 X |

FOREIGN PATENTS OR APPLICATIONS 813,708  5/1959  United Kingdom ................. 29/125

*Primary Examiner*—Alfred R. Guest
*Attorney, Agent, or Firm*—Michael J. Striker

[57] ABSTRACT

A multi-partite guide roll which is especially usable in continuous casting installations has a plurality of axially arrayed discrete roll sections which are connected by stems so that they are compelled to rotate jointly about a common axis. The stems may either be provided at one axial end of the respective roll sections and extend into an axial recess of an axially adjacent roll section, or the roll sections may each have axial recesses at their opposite axial ends and the stems may be separate elements having two end portions each received in the axially aligned recesses of two axially adjacent roll sections.

3 Claims, 6 Drawing Figures

MULTI-PARTITE GUIDE ROLL

BACKGROUND OF THE INVENTION

The present invention relates to a guide roll in general, and in particular to a multi-partite guide roll. The guide roll of the present invention is especially but not exclusively suited for use in continuous casting installations.

In continuous casting installations the cast slab or billet of metallic material, which is of a great length and moves continuously, must be appropriately guided by means of guide rollers. Usually, the casting is effected in vertical or near-vertical direction so that the slab moves vertically through a certain distance and is thereupon deflected to more or less horizontal direction of movement. For this purpose, guide rolls are provided. However, one-piece guide rolls have been found unsatisfactory if the slab being cast is relatively wide (in axial direction of the roll) and/or is to be cast rapidly so that it travels at relatively high speed. The prior art has proposed under these circumstances to replace the conventional one-piece guide rolls with guide rolls which are composed of a plurality of individual roll sections mounted on a common shaft which supports the individual roll sections for free rotation independently of one another. Because of the great heat to which these roll sections are subjected from the still hot (usually incondescent) cast slab or billet, the rolls are cooled by spraying cooling liquid onto them from the exterior, a measure which is also practiced in connection with one-piece rolls.

This manner of cooling is satisfactory for one-piece rolls. However, it has been found that it is not satisfactory in multi-partite guide rolls where individual roll sections are mounted for free independent rotation on a common shaft. The problem is that frequently only some of the roll sections of a guide roll will be in contact with the advancing slab or billet and will be frictionally turned by the same, whereas one or more other roll sections of the same guide roll will not be in contact and will therefore be stationary. When this happens, one and the same surface portion of the stationary roll section will always be facing towards the advancing slab or billet and will therefore receive the full effect of the heat radiated thereby. Spraying water onto the thus-stationary roll sections is no longer sufficient, under these circumstances, to cool them adequately; as a result, these roll sections including the bearings which mount them for free rotation on the common shaft of the roll, become heated to such an extent that they are destroyed or at least very substantially damaged. If subsequently the billet again frictionally engages the thus-damaged roll sections, these roll sections are no longer able to turn and block proper advancement of the billet. When this happens the only remedy normally available is to stop the continuous casting installation, and wait until the billet has cooled, remove the billet, remove the guide roll and replace it with another one or at least replace the damaged roll sections and the bearings thereof, and reinstall the guide roll. It is evident that the machine down-time involved, and the labor required to correct such a problem, mean substantial economic losses which heretofore have had to be accepted, absent a more satisfactory solution, but which evidently are undesirable.

SUMMARY OF THE INVENTION

Accordingly, it is an object of the present invention to provide a multi-partite guide roll which avoids the disadvantages outlined above with respect to the prior art.

More particularly, it is an object of the present invention to provide such a multi-partite guide roll wherein it is assured that if any part of the guide roll is in frictional contact with an element which travels over the guide roll, the entire guide roll will of necessity turn about its axis, thus preventing the disadvantages which exist in the prior art.

In keeping with these objects, and with others which will become apparent hereafter, one feature of the invention resides in a multi-partite guide roll, particularly for use in continuous casting installations, which comprises a plurality of axially arrayed discrete roll sections, and a plurality of stems interconnecting the axially adjacent roll sections for enforced joint rotation about a common axis.

This measure avoids the drawbacks of the prior art in that as long as even one of the roll sections is being frictionally entrained by the travelling element which it guides, i.e. in the previously discussed example a slab or billet which is being continuously cast, all of the roll sections will be compelled to rotate jointly with the thus-engaged roll section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
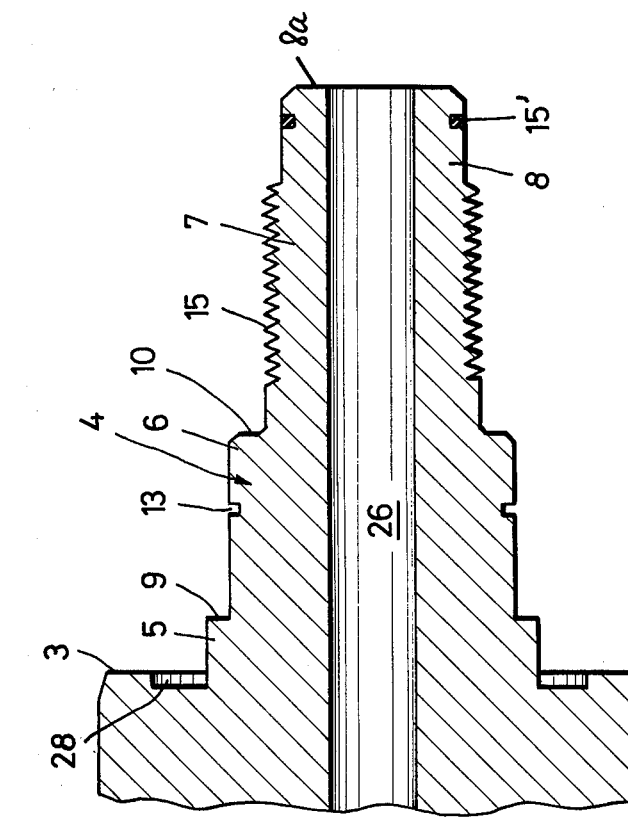
FIG. 1 is an axial section through a single roll section of a multi-partite guide roll according to one embodiment of the invention.
Figure 1:
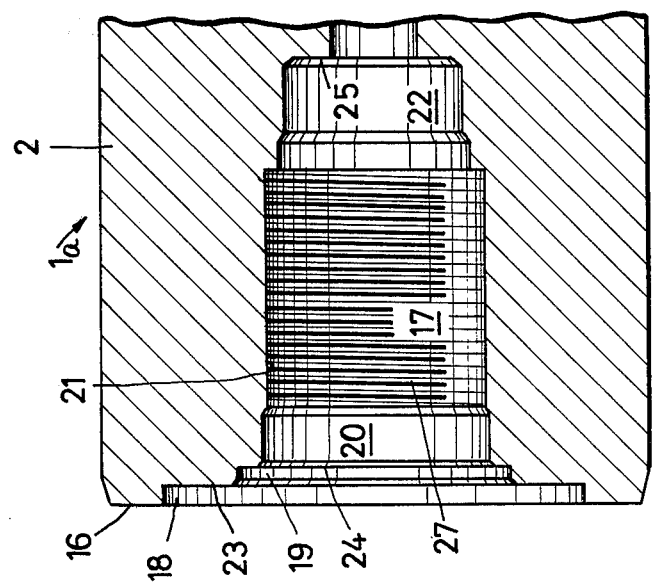
Figure 2:
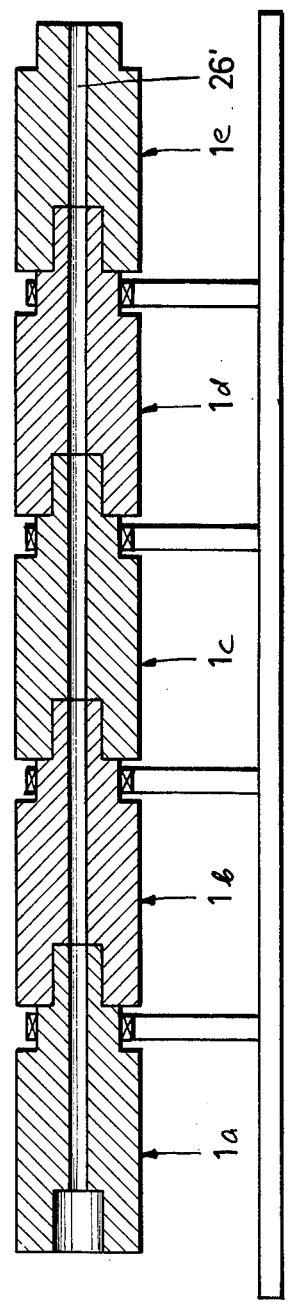
FIG. 2 is a somewhat diagrammatic axial section through a guide roll composed of a plurality of sections corresponding to the one shown in FIG. 1.
Figure 3:
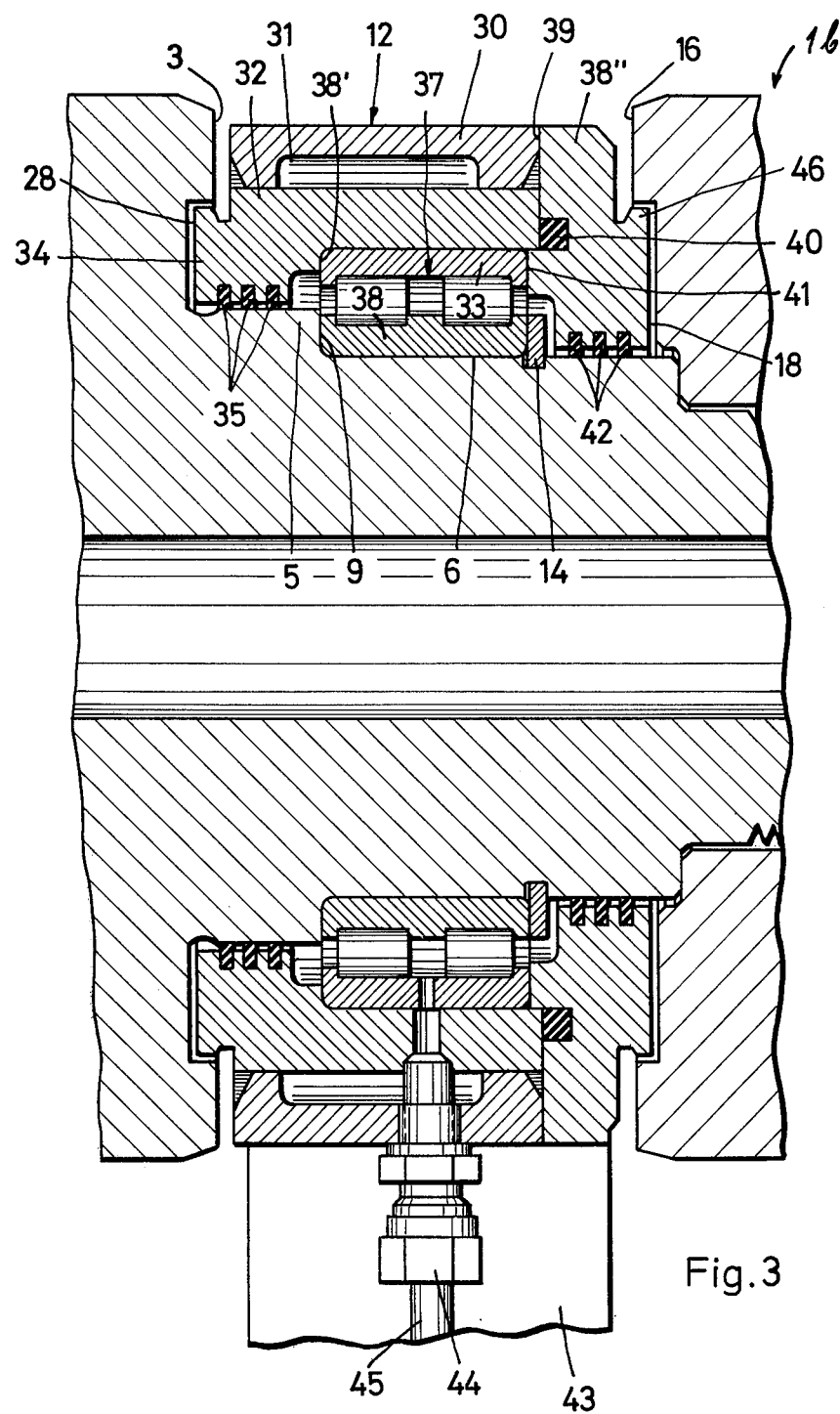
FIG. 3 is an axial section showing two of the roll sections shown in FIGS. 1 and 2, and a bearing which journals them for rotation.

Discussing the drawing now in detail, and firstly the embodiment illustrated in FIGS. 1-3, it will be seen that FIG. 2 diagrammatically illustrates a guide roll according to this first embodiment. This guide roll in FIG. 2 is composed of a plurality of axially arrayed discrete roll sections, 1a, 1b, 1c, 1d and 1e. Of course, there might be fewer or more than the illustrated number of roll sections. These roll sections are connected by stems, in a manner to be described with reference to FIGS. 1 and 3, so that they must necessarily rotate jointly, i.e. whenever any one or any group of the roll sections is entrained for rotation, the entire guide roll must similarly rotate. The guide roll is preferably provided, as shown in FIG. 2, with an axially extending passage 26' which is formed by bores in the individual roll sections 1a–1e, as will be discussed subsequently, and through which a cooling fluid, such as water, can be circulated to cool the guide roll from the interior thereof.

Details of the construction of the guide roll in FIG. 2 are illustrated in FIGS. 1 and 3 in particular.

As FIG. 2 shows, the roll sections 1a–1e are of identical configuration. Therefore it will suffice to discuss a single roll section 1a with respect to FIG. 1.

This roll section 1a will be seen in FIG. 1 to have a roller body 2 which has opposite axial end faces 3 and 16. From the end face 3 there projects a stem portion 4 which is composed of axially consecutive parts 5, 6, 7 and 8. The parts 5 and 6 have different diameters and therefore form with one another an annular shoulder 9; similarly, the parts 6 and 7 have different diameters and form with one another an annular shoulder 10. As will be discussed with reference to FIG. 3, the portions 5 and 6 are received in a journal 12 and the shoulder 9 serves as an abutment for the inner race of a roller bearing 37 of this journal. In addition, the portion 6 is provided with a circumferential groove 13 in which a circlip or spring ring 14 is installed (compare FIG. 3) that also engages the inner race of the bearing 37. The part 7 of the stem portion 4 is formed with an external thread 15 and the shoulder 10 which it forms at its junction with the part 6 serves as an abutment for the endface 16 of the axially adjacent roll section, in FIG. 3 the roll section 1b. The part 8 has a smooth outer circumferential surface and an endface 8a adjacent which it is bevelled, as shown in FIG. 1. The bevelling facilitates the insertion of the stem portion 4 into the cooperating roll section, the section 1b in the case of FIG. 3. The part 8 is further provided with a circumferentially extending groove in which a sealing ring 15' is received.

The opposite axial end of the roller body 2, where the endface 16 is located, is formed with a coaxial bore 17 which extends inwardly of the endface 16 and all the way to the endface 8a. The bore 17 is stepped and has bore portions 18, 19, 20, 22 and 26 of consecutively smaller diameter (FIG. 1). The bore portions 18 and 19 form at their juncture an annular shoulder 23, the bore portions 19 and 20 form at their juncture an annular shoulder 24, and the bore portions 22 and 26 define at their juncture an annular shoulder 25. The bore portion 21 is provided with an internal thread 27 which is dimensioned to mesh with the thread 15 of an axially adjacent roll section.

The shoulder 24 serves as an abutment for the shoulder 10 of an axially adjacent roll section, and these cooperating shoulders assure that all roll sections of a roll (compare FIG. 2) will rotate precisely in round. As FIG. 3 shows, which will presently be discussed, the bore portion 18 forms with the journal 12 a labyrinth-type seal, and for the same purpose the endface 3 of each roll section is formed with an annular recess 28 which is concentric to the part 5 of the respective stem portion 4.

At the juncture of each two connected roll sections, i.e. the roll sections 1a and 1b, the roll sections 1b and 1c, etc., there is provided a journal 12 so that each guide roll has a plurality of these journals. These journals have been omitted in FIG. 2 for the sake of clarity, but one of the journals 12 will now be described with reference to FIG. 3, it being understood that the journals 12 are all identical so that the description of a single one will suffice.

FIG. 3 shows the juxtaposed ends of the connected roll sections 1a and 1b; it is understood that this description is equally applicable to the juxtaposed ends of the roll sections 1b and 1c, of the roll sections 1c and 1d and of the roll sections 1d and 1e, respectively. Located at these respective juxtaposed ends is a journal 12 which has an outer housing shell 30 connected, as by welding, with an inner housing shell 32 with which it defines an annular clearance 31 for the circulation of a cooling fluid. Mounted in the inner housing shell 32 is a cageless roller bearing 37. In the vicinity of the endface 3 of the roll section 1a the inner housing shell 32 is provided with an annular axial projection 34 which extends into the recess 28; the inner annular surface of the inner housing shell 32 is formed in the region of the projection 34 with circumferential grooves in which sealing rings 35 are received that engage the outer circumferential surface of the part 5 of the stem portion 4. The inner housing shell 32 is further provided with an annular abutment shoulder 38a which engages the outer race 33 of the bearings 37 whose inner race 38 is mounted on the part 5 of the stem portion 34 in engagement with the shoulder 9. The previously-mentioned circlip 14 received in the groove 13 engages the opposite axial end of the inner race 38, i.e. the axial end remote from that which engages the shoulder 9, thus fixing the inner race 38 against axial displacement. The axial end of the outer race 33 which is spaced from the shoulder 38' is engaged by an annular end cover 38'' which abuts the common end face 39 of the outer housing shell 30 and the inner housing shell 32 and is connected to them, e.g. by welding. The end of the cover 38'' facing the inner housing shell 32 is provided with an annular recess in which a sealing ring 40 is received, and radially inwardly of this recess the end cover 38'' is formed with an annular axially projecting shoulder 41 which engages the adjacent end of the outer race 33 of the bearing 37. The axial end of the cover 38'' which faces in axially outward direction is provided with an annular projection 46 which extends into the recess 18 of the axially adjacent roll section, there the roll section 1b; in addition, the inner circumferential surface of the end cover 38'' is formed with annular grooves in which sealing rings 42 are received that engage the outer surface of the part 5 of the stem portion 4 of the roll section 1a.

The journal 12 is connected in suitable manner (e.g. by welding) with a support member 43 which in turn is mounted (not illustrated) on a support structure which supports the entire multi-partite guide roll. The support member 43 is provided with a coupling 44 which engages with coupling portions mounted in radially aligned bores of the housing shells 30 and 32 and which makes it possible to connect the interior of the journal 12 with a supply line 45 for supplying a lubricating and/or cooling medium.

To assemble the guide roll of FIGS. 1–3 the shell sections 30 and 32 are pushed onto the stem portion 4 of a respective roll section, e.g. the roll section 1a, and thereupon the bearing 37 is pushed onto the part 6 of the stem portion and the circlip 14 is put in place. Thereafter, the end cover 38 is secured in position, e.g. by welding or by means of (not illustrated) screws, and at this time the entire bearing also becomes centered on the stem portion 4. Subsequently the thread 15 is inserted into the axial bore of the adjacent roll section into mesh with the thread 17 in that axial bore and the two roll sections (1a and 1b in FIG. 3) are then turned relative to one another until the shoulders 10 and 24 of the roll sections are so tightly in abutment with one another that an unthreading of the thus-connected roll sections in operation becomes impossible. In addition, the individual connected roll sections are also connected with one another against relative angular displacement by means of one or more set screws, e.g. worm screws (not shown) and the finished guide roll then has the cooling passage 26' shown in FIG. 2. No attempt has been made in FIG. 3 to show the passages for the supply of fluid into and out of the annular clearance 31 of the respective bearing. This is conventional and requires no detailed explanation.

The finished guide roll must, of course, have bearings at its opposite axial ends, i.e. in FIG. 2 a bearing which cooperates with the roll section 1a and another bearing which cooperates with the roll section 1e. These bearings are in principle similar as the one shown in FIG. 3, except that the bearing cooperating with the roll section having an exposed axial recess (i.e. the roll section 1a in FIG. 2) must have a stem corresponding to the stem portion 4a of the respective roll sections. The stem portion 4 at the other end of the roll, i.e. the stem portion 4 of the roll section 1e, is shortened as compared to the stem portion 4 shown in FIG. 1 and corresponds to the part 6 thereof; it is this shortened portion which is received in the bearing at that end of the roll.

Figure 4:
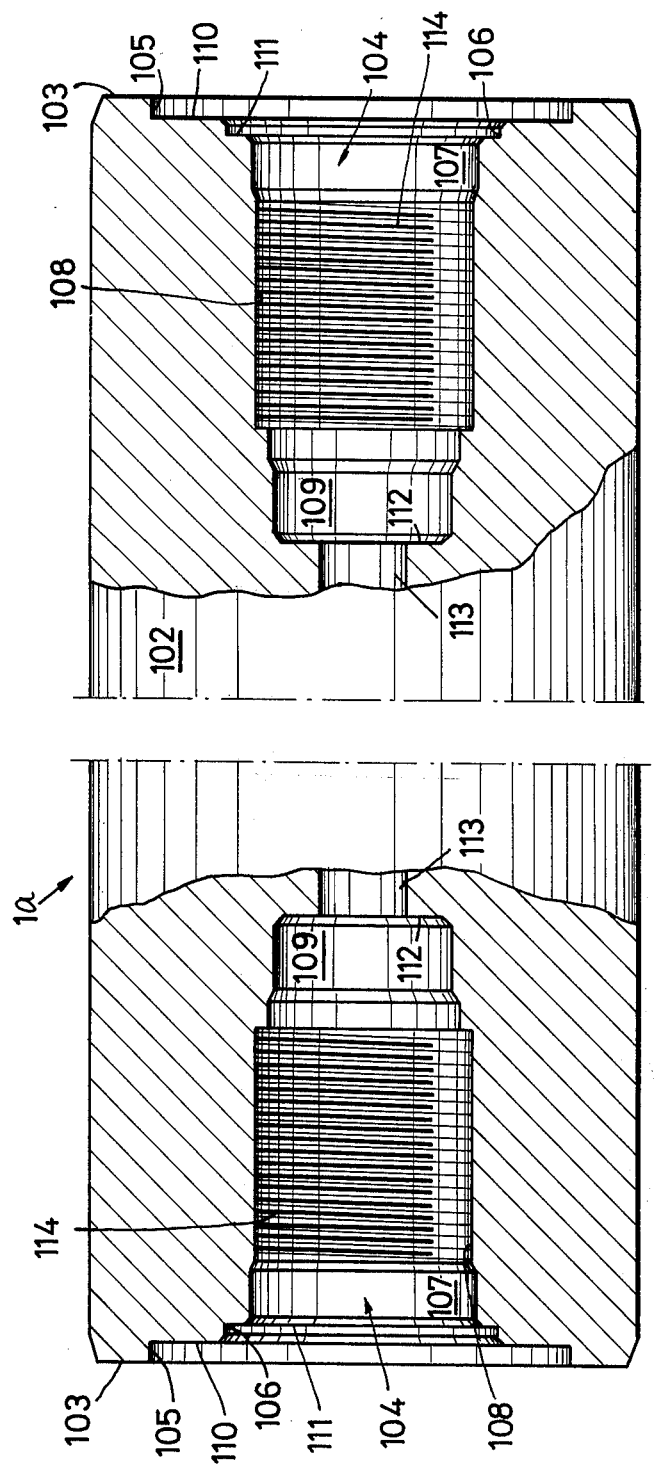
FIG. 4 is an axial section through a roll section according to a further embodiment of the invention.
Figure 5:
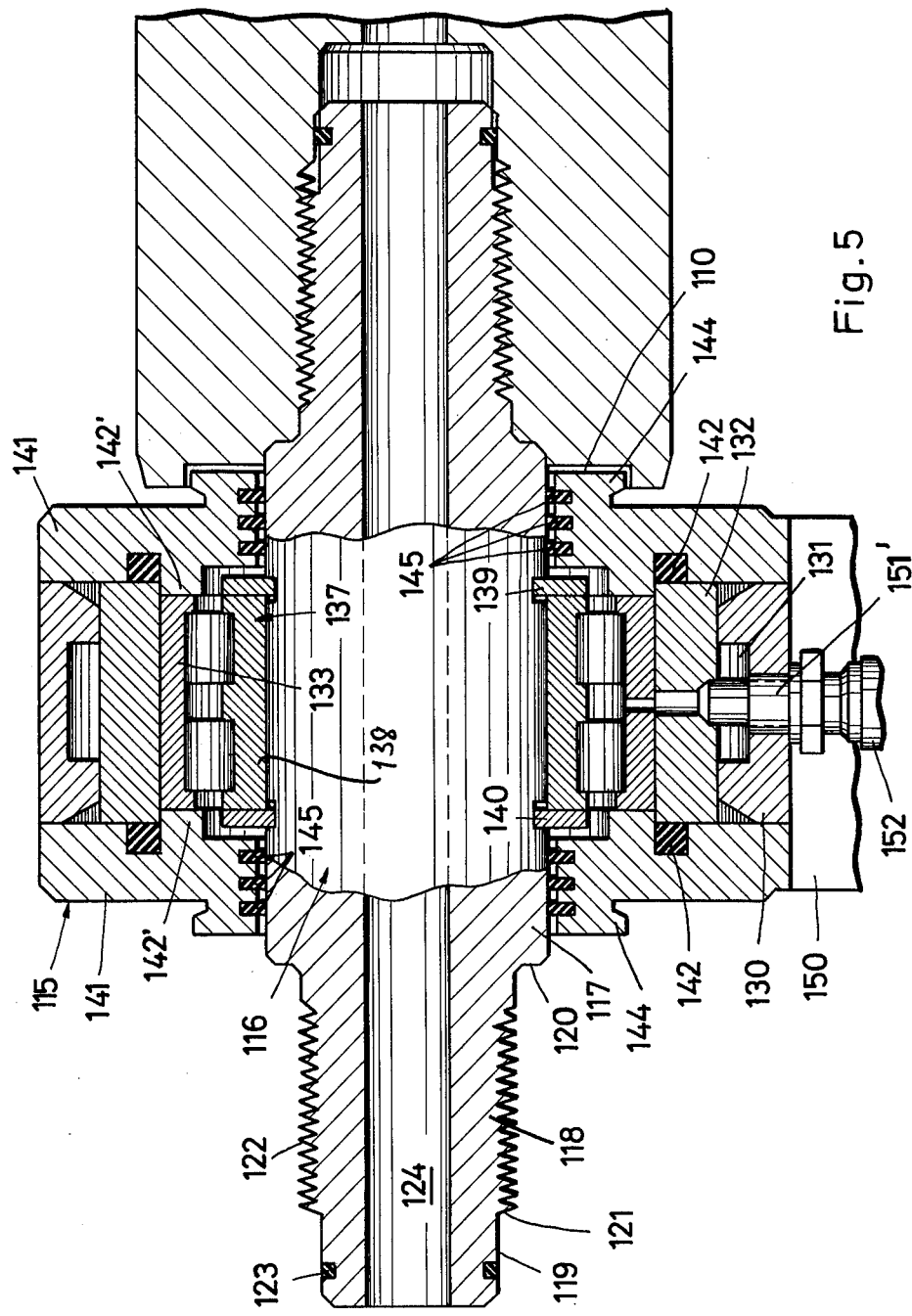
FIG. 5 is a view similar to FIG. 3 but illustrating details of the embodiment in FIG. 4.
Figure 6:
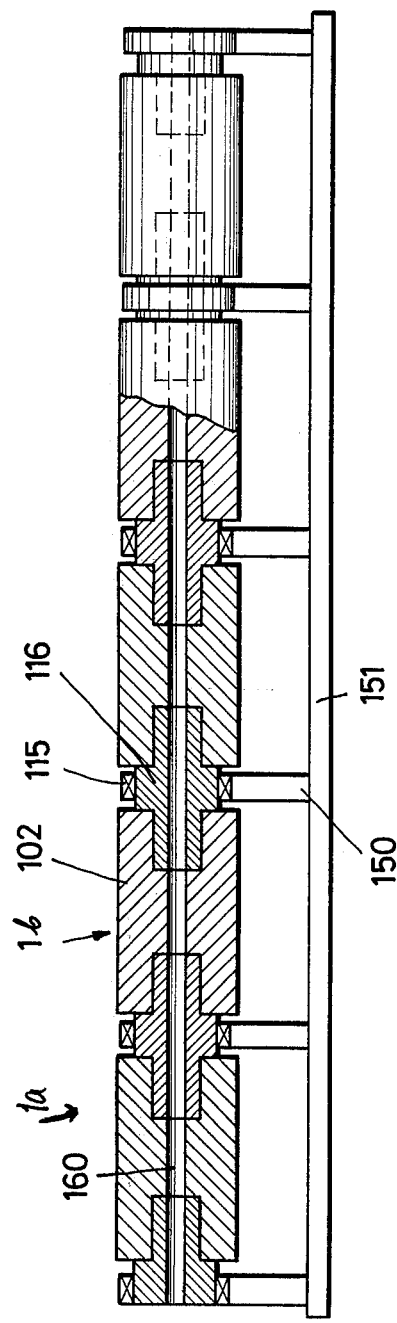
FIG. 6 is a view analogous to FIG. 2 but illustrates a guide roll in accordance with the embodiment in FIGS. 4 and 5.

A further embodiment of the invention is shown by way of example in FIGS. 4–6. In this embodiment the shell sections 1a–1e (1a and 1b are shown in FIG. 6) are not provided with integral stem portions as are the ones in FIGS. 1–3. Instead, each roll section in FIGS. 4–6 has a roll body 102, the opposite axial endfaces 103 of which are provided with axially aligned axial recesses or bores 104, each of which is composed of bore portions 105, 106, 107, 108 and 109. The bore portions 109 of the two bores 104 are connected by a passage 113. The bore portions 105 and 106 of each bore form with one another an annular shoulder 110, the bore portions 106 and 107 form a similar shoulder 111. The bore portions 109 each form with the center passage or bore 113 a further shoulder 112 that is also annular. The bore portions 108 in each case are provided with an inner thread 114 which is complementary to the outer thread 116 formed on the stems of which one is shown in FIG. 5.

As the roller bodies 102 are all identical, the illustration and description of the single one shown in FIG. 4 will suffice. Similarly, the stems 116 are also all identical so that the single one illustrated and described with reference to FIG. 5 will be sufficient for an understanding of the invention.

FIG. 5 shows that the stems 116 in this embodiment are separate, one stem 116 being provided for the connection of two adjacent ones of the roll sections 1a–1b, 1b–1c, etc. Each such stem 116 has a center portion 117 which is journalled for rotation in a journal 115 and which is provided with respective end portions that extend axially beyond the journal 115. Each of the end portions is composed of two parts 118 and 119; each end portion is to be received in a bore 104 of a respective roll section. Thus, if the right-hand end portion in FIG. 5 is received in the bore 104 of the roll section 1b, then the lefthand end portion in FIG. 5 would be received in the bore 104 of the roll section 1a. The center portion 17 forms with the part 118 of each end portion an annular shoulder 120, and the part 118 part 118 forms with the part 119 a further annular shoulder 121. Each shoulder 120 abuts a shoulder 111 of the respectively cooperating roll section and serves to assure that the finished guide roll will rotate in round. Each part 118 is formed with an external thread 122 which is complementary to the internal thread 114 of the cooperating roll section. The part 119 is formed with a circumferentially extending groove in which a sealing ring 123 is received. The stem 116 is further provided with a central axial bore 124 which, together with the similar bores 124 of all of the other stems 116, forms a guide passage 160 (see FIG. 6) for the internally supplied cooling fluid. The sealing rings 123 provide for a seal between the adjacent roll sections.

The housing of the journal 115 is composed of an outer shell 130 which is connected to (e.g. by welding) to an inner shell section 132 with which it forms an annular gap 131 for a cooling and/or lubricating fluid. Mounted in the inner shell section 132 is the outer race 133 of a cageless roller bearing 137 whose inner race 138 is mounted on the portion 117 of the respective stem 116 and which is prevented from axial displacement by circlips 139 and 140 which engage its opposite axial ends and are received in outer circumferential grooves of the portion 117. The outer race 133 is prevented against axial displacement by two annular end covers 141 which are connected to the shell sections 130 and 132, e.g. by welding or by screws, and which are each provided with an annular groove in which a respective sealing ring 142 is provided. The inner surfaces of these end covers 141 are also provided with inwardly projecting annular projections 142' that engage the outer race 133; the axially outer sides of the end covers 141 are each provided with an axially projecting annular projection 144 which extends into the bore portion 105 of the respectively associated roll section. The inner circumferential surfaces of the annular end covers 144 are provided with inserted sealing rings 145 which engage the outer surface of the portion 117.

In this embodiment, also, the journal 115 is connected with a support 150, e.g. by welding, by means of screws or the like, which is to be connected to the support for the completed guide roll, for example with the diagrammatically illustrated traverse 151 which is shown in FIG. 6. The supports 150 are provided with a coupling 151 cooperating with coupling portions installed in radially aligned bores of the shell sections 130 and 132, to permit the connection of the respective journal 115 with a fluid supply line 152 which supplies lubricating and/or cooling fluid.

To assemble the roll shown in FIGS. 4–6 the bearings 137 are placed onto the respective stems 116 and thereupon the respective circlip 139 is put in place. After also putting in place the circlip 140 the unit composed of the sections 130 and 132 is put in place and then the end covers 142 are installed. Subsequently the end portions of the stem 116 which project beyond the journal 115 are threaded into the bores 104 of the respective roll sections to be connected, e.g. the roll sections 1a and 1b, and the threading-together is carried on until the respectively cooperating shoulders 110 and 120 are so firmly in frictional contact that they are not likely to unthread during operation of the roll. Additionally, set screws (such as worm screws) are provided, which are not illustrated but which serve to fix the respective roll sections onto the stem which connects them.

The bores which permit the supply and removal of fluid into and from the annular clearance 131 have not been illustrated; it will be obvious to those of ordinary skill in the art that they must be provided and how they can be provided.

The bearings at the opposite ends of the completed roll (compare FIG. 6) are similar to the journals 115 of which one is shown in FIG. 5, but will each be provided with only one of the end portions of the respective stem 116, the axially outwardly facing end portion being omitted.

The present invention assures that under all circumstances all roll sections of a multi-partite guide roll constructed according to the present invention will rotate in unison, even though only one (or more, but not all) of the roll sections is in frictionally entraining contact with a travelling member, e.g. a cast slab or billet. Moreover, due to the cooling channels which are made possible in accordance with the present invention, these rolls according to the present invention can be cooled internally, so that they can be adequately cooled even if they are located immediately adjacent the crucible from which the material for the slab is being cast, so that the rolls can be cooled adequately and an excessively strong heating of the rolls and of the lubricant for their journals, is reliably avoided. In particular, the present invention makes it possible to provide such rolls even in the immediate vicinity of the crucible, even though the rolls there would have to be of small diameters. This is in contradistinction to the prior art where, in situations where space is at a premium, such as immediately adjacent the crucible, glide bearings were employed for guiding the cast slab rather than using small-diameters rolls. Since all roll sections of a roll constructed according to the present invention are provided with respective bearings, the retardation forces acting upon the travelling cast slab can be substantially reduced and the casting speed can be substantially increased.

It will be understood that each of the elements described above, or two or more together, may also find a useful application in other types of constructions differing from the types described above.

While the invention has been illustrated and described as embodied in a multi-partite guide roll, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A multi-partite guide roll, particularly for use in continuous casting installations, comprising a plurality of axially arrayed discrete roll sections each having two axial ends; a plurality of stems interconnecting the axially adjacent roll sections for enforced joint rotation about a common axis, each of said stems being provided at one of said axial ends of a respective one of said roll sections and received in an axial recess at another axial end of an axially adjacent one of said roll sections; and bearing means in the region of said stems intermediate the axially adjacent ones of said roll sections arranged for mounting said roll for rotation.

2. A guide roll as defined in claim 1, wherein said recesses and stems of said roll sections are stepped in axial direction.

3. A guide roll as defined in claim 1, wherein said guide roll is formed with an axially extending passage for cooling fluid, said passage extending through said roll sections.

* * * * *